(12) United States Patent
Rubin et al.

(10) Patent No.: US 7,397,351 B1
(45) Date of Patent: Jul. 8, 2008

(54) USE OF E-FIELD SENSORS FOR SITUATION AWARENESS/COLLISION AVOIDANCE

(75) Inventors: Eugene S. Rubin, Newton Centre, MA (US); Paul A. Zank, Brookline, NH (US); Paul D. Zemany, Amherest, NH (US); Eldon M. Sutphin, Merrimack, NH (US)

(73) Assignee: BAE Systems Information And Electronic Systems Integration Inc., Nashua, NH (US)

( * ) Notice: Subject to any disclaimer, the term of this patent is extended or adjusted under 35 U.S.C. 154(b) by 152 days.

(21) Appl. No.: 11/185,998

(22) Filed: Jul. 20, 2005

(51) Int. Cl.
*B60Q 1/00* (2006.01)

(52) U.S. Cl. .................. 340/435; 340/436; 340/561; 324/457

(58) Field of Classification Search .......... 340/435, 340/436, 438, 666, 667, 561, 550, 555; 701/45; 324/457, 72; 318/266, 286, 445
See application file for complete search history.

(56) References Cited

U.S. PATENT DOCUMENTS

| | | | | |
|---|---|---|---|---|
| 6,853,307 | B2 * | 2/2005 | Nickerson | 340/685 |
| 6,922,059 | B2 * | 7/2005 | Zank et al. | 324/457 |
| 6,936,986 | B2 * | 8/2005 | Nuber | 318/445 |
| 6,937,151 | B1 * | 8/2005 | Tapanes | 340/550 |

OTHER PUBLICATIONS

"ACC Market & Technology—Excerpt" (Adaptive Cruise Control), Tier One, www.tierone.com/accmtrexcerpt.html, (downloaded Jun. 2, 2005).

Braunstein, Janet, "Active Safety: When the Car Takes Over," AMI Auto World Magazine, shared article, www.autotrader.com/research/shared/article.jsp?article_id=2 (downloaded Jun. 2, 2005).

Australian Communications Authority, "A Review of Automotive Radar Systems—Devices and Regulatory Frameworks," Apr. 2001.

"Beyond Cruise Control," The Economist Science/Technology Quarterly, Jun. 21, 2001, www.economist.com/science/tq.

Sharke, Paul, "Smart Cars," Mechanical Engineering, Mar. 2003, www.mamagazine.org/backissues/mar03/features/smartcar/.

"First in World Sensor to Combine Traffic Information and Entertainment for Drivers," www.autoemirates.com/International/2005/0519TrafficSensor (downloaded Jun. 2, 2005).

"AC Assist / Roadster TR 1004," Tap for Transport Archive, www.cordis.lu/telematics/tap_transport/research/projectsum/ac (downloaded Jun. 2, 2005).

"European firms accelerate through the crash barrier," Electronics Weekly, Aug. 12, 1998, www.electronicsweekly.com/Article12562.htm.

* cited by examiner

*Primary Examiner*—Anh V La
(74) *Attorney, Agent, or Firm*—Robert K. Tendler

(57) ABSTRACT

E-field sensors are used to establish a protection zone around a vehicle so as to detect the presence of objects within the protection zone, be they other vehicles or individuals. In one embodiment the direction to the intruding object is established by virtue of the use of pairs of E-field sensors. In a further embodiment the range of the E-field sensors determines the limited protection zone around the vehicle. Because of the limited protection zone, false alarms are greatly reduced.

25 Claims, 7 Drawing Sheets

USE OF E-FIELD SENSORS FOR SITUATION AWARENESS/COLLISION AVOIDANCE

REFERENCE TO RELATED APPLICATIONS

This application claims rights under 35 USC § 119(e) from U.S. patent application Ser. No. 11/148,499 filed Jun. 9, 2005 by Paul A. Zank et al. entitled "Method and Apparatus for Detecting Individuals Using Electrical Field Sensors," assigned to the assignee hereof and incorporated herein by reference; U.S. patent application Ser. No. 11/104,125 filed Apr. 12, 2005 by Eugene S. Rubin et al. entitled "Method and Apparatus For Avoidance Of Power Lines or Trip Wires By Fixed and Rotary Winged Aircraft," assigned to the assignee hereof and incorporated herein by reference.

FIELD OF THE INVENTION

This invention relates to providing a protection zone around a vehicle and more particularly to the use of electrical field (E-field) sensors to detect the presence and location of other vehicles and/or individuals within the protection zone.

BACKGROUND OF THE INVENTION

As has recently been described, there is a growing market for adaptive cruise control that is designed to either warn a driver of dangerous conditions or to actually take over the control of the car to avoid the dangerous condition. According to the National Highway and Traffic Safety Agency, dangerous conditions include road run-off, rear-end collisions, lane change and merge, and drowsy driver problems.

Various companies have instituted radar-based collision avoidance and warning systems that use relatively expensive radar units, which require consideration of RF frequency regulations and generally are not able to pinpoint the direction of an object due to the relatively wide lobes of the radar beams. Radar-based systems can therefore not reliably detect, for instance, whether an oncoming car is in the traffic lane used by the vehicle or, for that matter, detect whether or not radar returns are from a stationary target such as a tree or a road sign. Moreover, these systems are incapable of discerning the presence of individuals.

In order to compensate for the deficiencies of radar-based systems, be they laser-based or RF-based, proposals have been made to complement these systems with optical systems to analyze a scene and determine the presence of objects in the scene. These systems, however, suffer from the inability to reliably distinguish between various types of objects and require a considerable amount of computational overload.

As to backup warning systems, these systems typically employ acoustic imaging.

The result is that while there are not only collision avoidance systems, collision warning systems, adaptive cruise control systems, steer-by-wire systems, brake-by-wire systems and other automatic systems, these systems have relied principally on radar or lidar as sensors.

While lidar and radar systems do provide considerable range for the detection of returns from targets, they oftentimes result in false alarms precisely due to the range at which they operate. Moreover, the systems cannot, for instance, distinguish when an object is at car level as opposed to an overhanging sign, which may fool the system into automatically applying braking or other collision avoidance protocols such as collision avoidance steering.

It will be appreciated that if systems are employed that do more than merely alert the driver to obstacles or fast-approaching vehicles, then taking the control of the vehicle from the driver can result in serious consequences without a robust system to be able to differentiate between those objects which could cause harm to the vehicle and the occupants thereof, versus those artifacts which are not to be acted on.

There is therefore a necessity to provide a reliable and inexpensive means for establishing a protection zone around a vehicle and to provide some indication of where a particular vehicle or individual is with respect to the vehicle in question in the protection zone.

It has been reported by the National Highway Safety Agency that the number of traffic accidents can be markedly reduced when using sensors that can detect out-of-normal conditions. In such systems that use microprocessors and radars, if one can anticipate an out-of-normal condition, then one can invoke, for instance, engine controllers to retard or speed the engine towards a desired result, an ABS controller to apply or release brakes toward a desired result or to arm and deploy an airbag to prepare for impact, depending on the expected time, direction and severity of the detected potential impact.

The above-mentioned radar-based systems have been deployed front, rear and side to reduce lane change accidents and to provide advance warning to deploy airbags. Moreover, such systems have been designed to counteract unwanted turning in a panic situation.

However, all of the above systems to some extent require various forms of radar and/or an overlay of optical sensing in order to be able to reliably distinguish the type of obstacle or threat to the vehicle.

Aside from automobiles and trucks, in the military there is a need to be able, for instance, in tanks when one's vision is obscured, to detect the presence of combatants within a security perimeter of the tank. This type of situation occurs when individuals carrying satchel charges or other explosive devices sneak up to a tank unnoticed and attach or explode a device right at or on the skin of the tank. Moreover, for instance in armored vehicles such as Humvees or halftracks, a lookout is positioned at the top of the vehicle to be able to scout the perimeter of the vehicle. Additionally, tanks are sometimes provided with periscope sights and the like that have only a limited field of view and are therefore not useful in detecting close-in stealthy activity. Moreover, at nighttime there is no particularly good way to detect the presence of near-in individuals, which results in each tank or fortified vehicle having to provide for patrols to make sure that the vehicles and the occupants therein are safe.

With the adoption of IEDs, improvised explosive devices, their effective range at 3 to 5 feet is deadly and it is for this purpose that it would be desirable to provide a sensing system for such military vehicles to be able to detect the presence of intruders and to, for instance, be able to automatically actuate vehicle protective devices such as, for instance, shaped charges aimed away from the vehicle to countermeasure the intruder.

Thus, both for commercial auto safety reasons and for military security, there is a need for a sensing system that can detect the presence of individuals or objects within a protection zone around the vehicle, with the sensors providing 360° protection as well as being able to detect not only azimuth but also elevation of intruding objects.

SUMMARY OF INVENTION

Rather than utilizing radar-based devices, which aside from being expensive and incapable of distinguishing between objects of interest and objects that are not of interest, and rather than providing a system that emits radiation and that can be detected, now in the subject invention all of these sensors are replaced by passive E-field sensors of the type described in U.S. patent application Ser. No. 11/148,499 filed Jun. 9, 2005 by Paul A. Zank et al. entitled "Method and Apparatus for Detecting Individuals Using Electrical Field Sensors," assigned to the assignee hereof and incorporated herein by reference; U.S. patent application Ser. No. 11/104,125 filed Apr. 12, 2005 by Paul A. Zank et al. entitled "Method and Apparatus For Avoidance Of Power Lines or Trip Wires By Fixed and Rotary Winged Aircraft," assigned to the assignee hereof and incorporated herein by reference; and U.S. Patent Application 60/578,745 filed Jun. 10, 2004 by Paul A. Zank et al. entitled "Method and Apparatus for Detecting Sources of Projectiles," assigned to the assignee hereof and incorporated herein by reference. It has been found that these sensors can detect individuals due to the change in the E-field produced as the individual moves across the ground and can also be used, for instance, to detect objects that are moving with respect to the E-field sensors. Moving objects create a change in the E-field relative to the E-field sensor, with dE/dt algorithms providing for the detection of the altered E-field.

The E-field sensors used for the subject invention come in two varieties. First are those that sense the E-field gradient in terms of voltage across a very, very high-terraohm impedance. Secondly, it has been found that one can sense the local E-field sufficiently well by sensing current at significantly lower input impedances. It has been found that E-fields due to individuals and moving objects can be reliably sensed by either method. Therefore, when the term "E-field sensor" is used herein, it refers to either mode of E-field sensing.

It is noted that E-field sensors do not use any active sensing capability but rather are passive sensors. Therefore their presence, at least for military purposes, cannot be ascertained. Moreover, since the sensors emit no irradiation, there are no RF compliance issues in deploying an E-field sensor-based system on commercial vehicles. Moreover, the E-field sensors, being totally passive, do not affect any of the vehicle electronics because they emit no radiation.

As described in U.S. patent application Ser. No. 11/148,499 filed Jun. 9, 2005 by Paul A. Zank et al. entitled "Method and Apparatus for Detecting Individuals Using Electrical Field Sensors," it has been found that these E-field sensors can detect the presence of individuals. This is because the individual creates a capacitance-to-ground short upon movement of the individual's feet that results in a characteristic E-field signature. Thus, even individual footsteps can be recognized in terms of the presence of the individual within the range of the E-field sensor.

It has also been found by using pairs of E-field sensors and noting the difference in amplitude of the disturbance at two spaced-apart sensors that the direction of the object distorting the E-field can be ascertained.

As described in U.S. patent application Ser. No. 11/104,125 filed Apr. 12, 2005 by Eugene S. Rubin et al. entitled "Method and Apparatus For Avoidance Of Power Lines or Trip Wires By Fixed and Rotary Winged Aircraft," it is possible to use these pairs of E-field sensors, for instance, in wire strike avoidance systems in which a pilot can be alerted to the presence and direction of a power line or other type of structure as he is flying towards it. Because of the use of the pairs of E-field sensors, the direction to the power line or tower can be ascertained, with the E-field being distorted by the mere presence of the wire whether or not powered, or the electric field disturbance that is generated when the line is powered.

As illustrated in U.S. Patent Application 60/578,745 filed Jun. 10, 2004 by Paul A. Zank et al. entitled "Method and Apparatus for Detecting Sources of Projectiles," it is also possible to detect the trajectory of an incoming round or bullet using an array of E-field sensors. It has been found that an object moving through the earth's normal E-field causes a disturbance that can be detected and the trajectory of the incoming round or object can be ascertained, thereby to be able to detect the source of the round.

It can thus be seen that the E-field sensor offers a unique passive method of establishing the presence of an object that has relative motion with respect to the E-field sensor or whose inherent action itself varies the E-field as, for instance, when individuals are walking across the ground.

This being the case, it is the purpose of the subject invention to use pairs of E-field sensors to detect, for instance, the presence of individuals or objects within a 360° protection zone. E-field sensors can not only warn of the proximity or presence of an object in the protection zone, they can also determine the direction of the object and by various means also the distance of the object to the E-field sensor.

From the military perspective it is extremely important to be able to sense stealthy activity so that countermeasures can be immediately deployed against an intruder.

In terms of vehicle safety, the E-field sensors can, for instance, be used to detect an object moving relative to the vehicle which is in the protection zone of the vehicle. Thus, for instance, in a lane change situation when a vehicle in the outside lane wishes to switch to the inside lane but by doing so would cause an adjacent vehicle to be in the protection zone, the direction and the presence of the blind side vehicle can be made known to the driver and appropriate evasive action can be taken. Moreover, in terms of automatic braking when a driver is too closely following a vehicle, the presence of the vehicle in the protection zone can result in immediately alerting the driver to an impending crash or accident situation. Moreover, since the direction of the intruding object can be easily ascertained using the dual sensor approach, vehicles going in the other direction in an adjacent lane can be ignored.

A second method of discriminating against vehicles coming in the other direction is to limit the protection zone to, for instance, 5-15 feet. This has an exceedingly useful aspect of the subject invention to eliminate false alarms because the objects that can cause no harm are outside the protection zone.

E-field sensors' range can be limited by the size of the E-field sensors to eliminate, for instance, the effect of objects that would cause no harm.

Also in terms of a backup alarm, not only can the E-field sensors be used to sense the presence of a vehicle or object into which a vehicle is backing, it can also indicate the presence of an individual, animal or other object that happens to be within the protection zone.

This being the case, there is a simple solution to the false alarm rates associated with radars, be they lidars or microwave devices, due to limiting of the range of the E-field sensor. Secondly, the direction of the object that is within the protection zone can be readily and quickly ascertained so as to appropriately invoke whatever measures are necessary, either as a warning system or as an adaptive control system.

Finally, providing vertically mounted pairs of E-field sensors can provide elevation angle. Elevation angle can be used to discriminate against overhanging signs, trees or the like that would not interfere with the operation of a vehicle.

As will be appreciated, the provision of patches as antennas for E-field sensors is an exceptionally inexpensive way to provide a zone of protection around a vehicle, with the E-field sensors being mounted either in the bumpers or fenders of the vehicle or within the doors or other exterior vehicle surfaces. Because the sensors themselves are planar, or can be made to conform to any surface, they are visually undetectable so that they can be readily incorporated into vehicles without altering the appearance of the vehicle. This is useful for consumer-oriented items such as automobiles, but is also useful in the military context so as not to alert an intruder or enemy combatant as to the existence of such a protection system. Moreover, since these systems are completely passive, other individuals or enemy troops are not apprised of the existence of the protection system around the vehicle. Having visible protection permits enemy troops to avoid such vehicles and attack those who do not have protection.

As compared with radar, the cost of the E-field sensing systems is an order of magnitude less. Moreover, since they are passive, there are no RF regulatory requirements on the deployment of such E-field sensors.

In terms of military use, especially with tanks and armored vehicles where visibility is limited, E-field sensors can be readily mounted on tank tread fenders or the like without being noticeable.

In summary, E-field sensors are used to establish a protection zone around a vehicle so as to detect the presence of objects within the protection zone, be they other vehicles or individuals. In one embodiment the direction to the intruding object is established by virtue of the use of pairs of E-field sensors. In a further embodiment the range of the E-field sensors determines the limited protection zone around the vehicle. Because of the limited protection zone, false alarms are greatly reduced.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
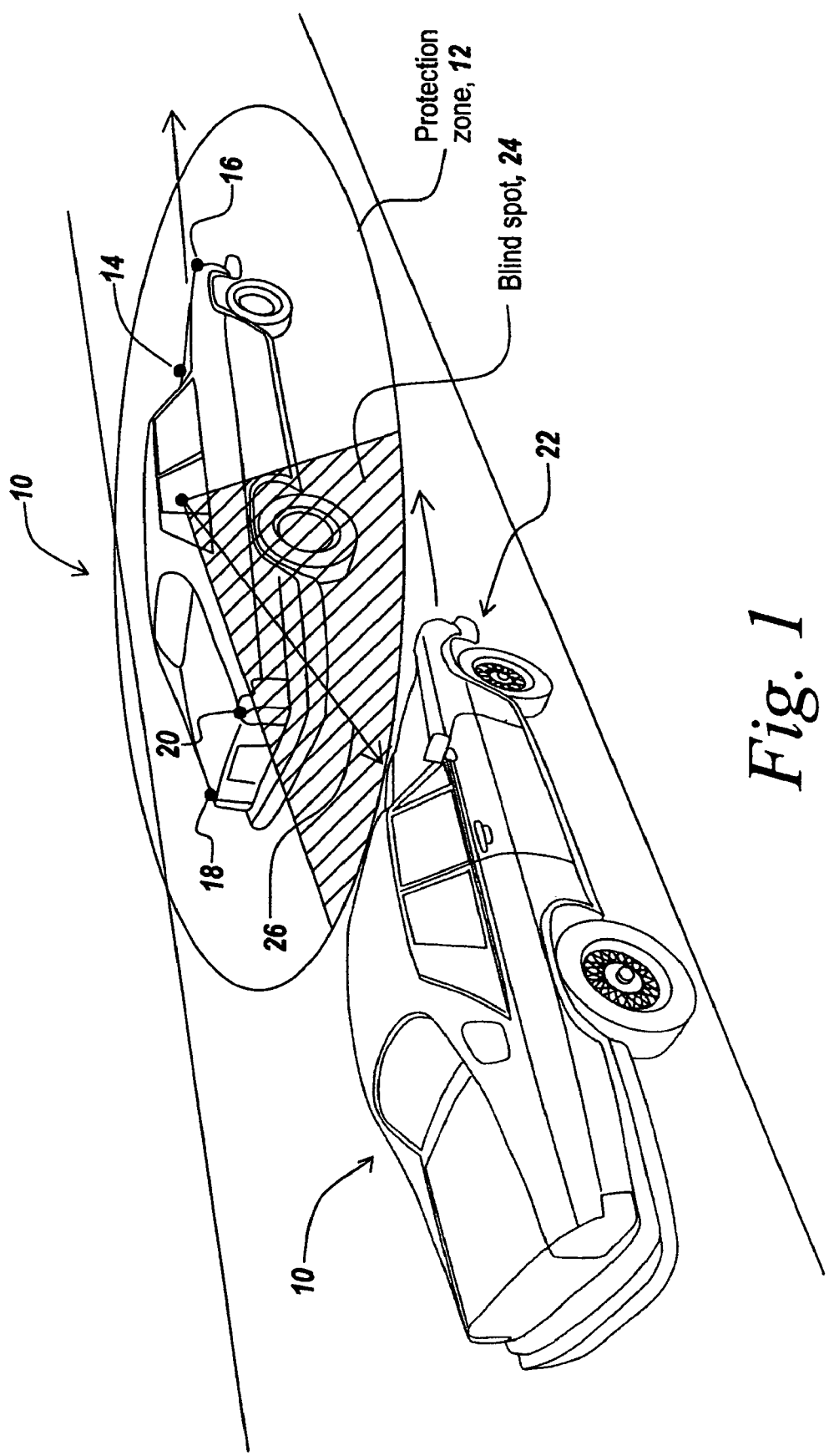
FIG. 1 is a diagrammatic illustration of the use of E-field sensors to provide a protection zone around a vehicle executing a lane change.

Referring now to FIG. 1, a vehicle 10 has a system that establishes a protection zone 12 about the vehicle through the use of pairs of E-field sensors, here illustrated at 14, 16, 18 and 20 respectively located on the front and rear bumpers of the vehicle.

As is common during a lane change operation when, for instance, a vehicle in an outer lane wants to proceed to an inner lane, if there is a vehicle 22 in a blind spot 24 in the rear quarter of the viewing of the driver of the vehicle, it is important to be able to alert the driver that there is an impediment to the lane change, meaning that there is a vehicle into which he or she would run if the lane change were executed.

As will be described hereinafter, pairs of E-field sensors can be located on a vehicle to establish protection zone 12, which in one embodiment extends approximately 15 feet around the vehicle.

The relative motion of vehicle 22 with respect to vehicle 10 is sensed by the E-field sensors and the direction thereof shown by arrow 26 was generated from processing the outputs of pairs of E-field sensors.

Aboard the vehicle is a processor that processes the outputs from the E-field sensors, determines an appropriate signature to be that of a moving vehicle and provides either an alarm for the driver of vehicle 10 corresponding to the presence of vehicle 22 in the protection zone at a position on the aft quarter of the vehicle or in an automatic embodiment can instigate evasive steering and/or braking in order to avoid a collision between the lane change vehicle and the vehicle in the lane to which the vehicle is headed.

As will be described, the system is extremely inexpensive and is passive in nature, with the only requirement being that there be a relative speed difference between the sensors on the sensing vehicle and the sensed vehicle.

As has been demonstrated hereinbefore, vehicles moving with respect an E-field sensor provide a dE/dt indication of the presence thereof due to the alteration of the normally occurring E-field in which both vehicle 10 and vehicle 12 exist. This variation in E-field, or more particularly the partial derivative thereof, is used in one embodiment to set off an alarm that such an object is within protection zone 12.

Not only can the presence of a vehicle within the protection zone be annunciated to or displayed to the driver of vehicle 10, its position as noted by arrow 26 can also be ascertained. Thus the driver can be alerted to where the object is that is within the protection zone, be it on the aft quarter, ahead of the vehicle or behind the vehicle.

As will be seen, using multiple pairs of sensors, it is possible to provide the system with 360° coverage. With combinations of four sensors one can switch between the pairs that one is looking at in order to provide quadrants in which an object has penetrated the protection zone.

Figure 2:
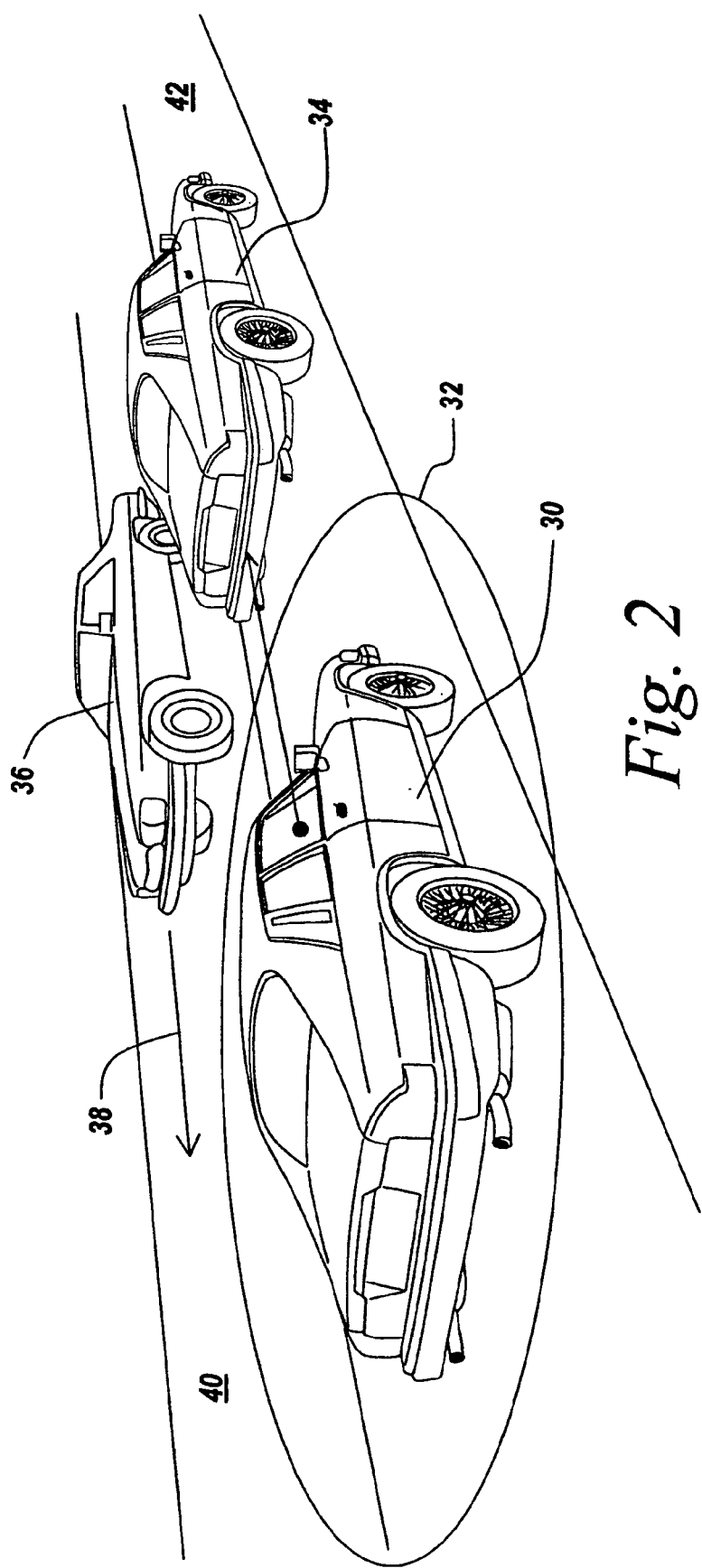
FIG. 2 is a diagrammatic illustration of the use of E-field sensors to provide a forward protection zone so as to sense the proximity of a vehicle ahead of the vehicle carrying the E-field sensors, which when it occurs within the protection zone provides a warning or brake activation, with the protection zone excluding the vehicles running in the opposite direction on a different lane.

Referring now to FIG. 2, in addition to sensing lane change problems, when a vehicle 30 having a protection zone 32 too closely approaches or follows a vehicle 34, which enters the protection zone, then it is possible to alert the driver of vehicle 30 that he is too close to the vehicle in front of him, at which point, if desired, the vehicle can be slowed down or the vehicle's brakes may be applied to avoid a rear end collision.

Again, protection zone 32 is generated by E-field sensors as opposed to radar or optical means, which provides a stealthy, inexpensive way of providing the protection zone and providing electronics for the learning of an impending rear end collision.

Also important is the fact that, with the proper configuration of the E-field sensors by the size thereof, one can limit the protection zone 32 to, for instance, 10 to 15 feet about the vehicle. What this means is that a vehicle 36 traveling in an opposite direction 38 in a lane 40 adjacent lane 42 in which vehicle 30 is traveling will not set off the E-field alarm and therefore will not provide a false alarm. It is noted that vehicle 36 provides no threat to vehicle 30 and may and should be ignored by the system aboard vehicle 30.

Figure 3:
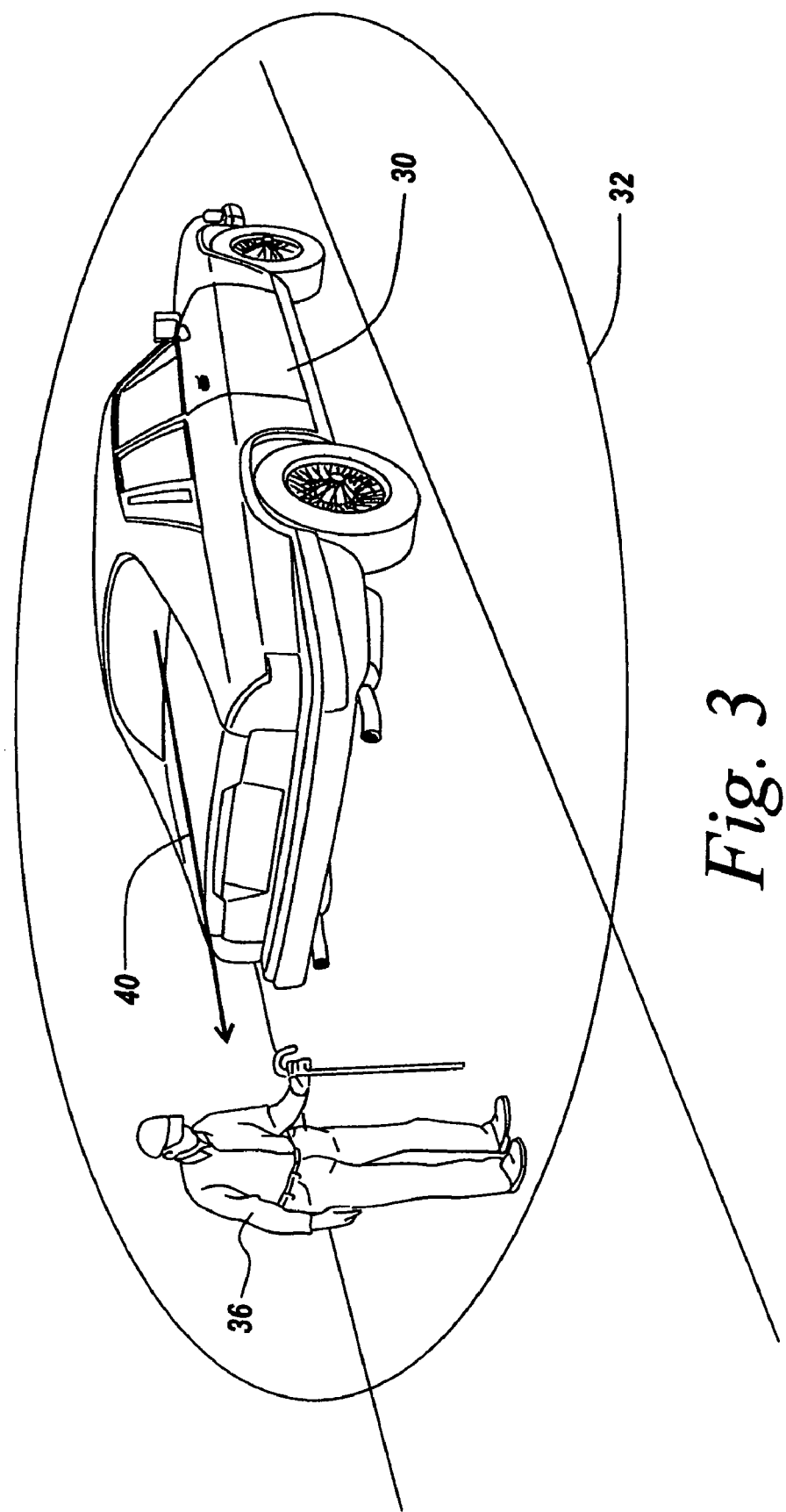
FIG. 3 is a diagrammatic illustration of the use of an E-field sensor protection zone to provide a backup warning system for the sensing of an individual behind a backing vehicle.

Referring now to FIG. 3, if the same vehicle 30 is provide with an identical protection zone 32, it is a finding of the subject invention that an individual 36 walking behind vehicle 32 may be sensed due to the changes of the E-field that the individual makes when walking across a road or other surface. As mentioned hereinbefore, this individual presents a very recognizable signature due to the change of E-field as his footsteps increase the capacitance to ground of the individual, which footsteps distinguish the individual from other types of objects.

Thus it is possible, with signature recognition techniques to be described, to distinguish an individual and provide a specialized alarm from the point of view of a backup alarm system to indicate the presence of an individual. Moreover, the subject system may be used to detect a child or other individual who happen to dart out in front of the vehicle.

The system may also be used to detect stationary objects because there is relative motion between the backing vehicle and the stationary object. Thus the subject E-field system can be used to give a specialized alarm for individuals and a different type of alarm for static objects.

It is noted also that the direction 40 of individual 36 may be ascertained and therefore provide an indication of where behind the backing vehicle the individual or impediment is.

Figure 4:
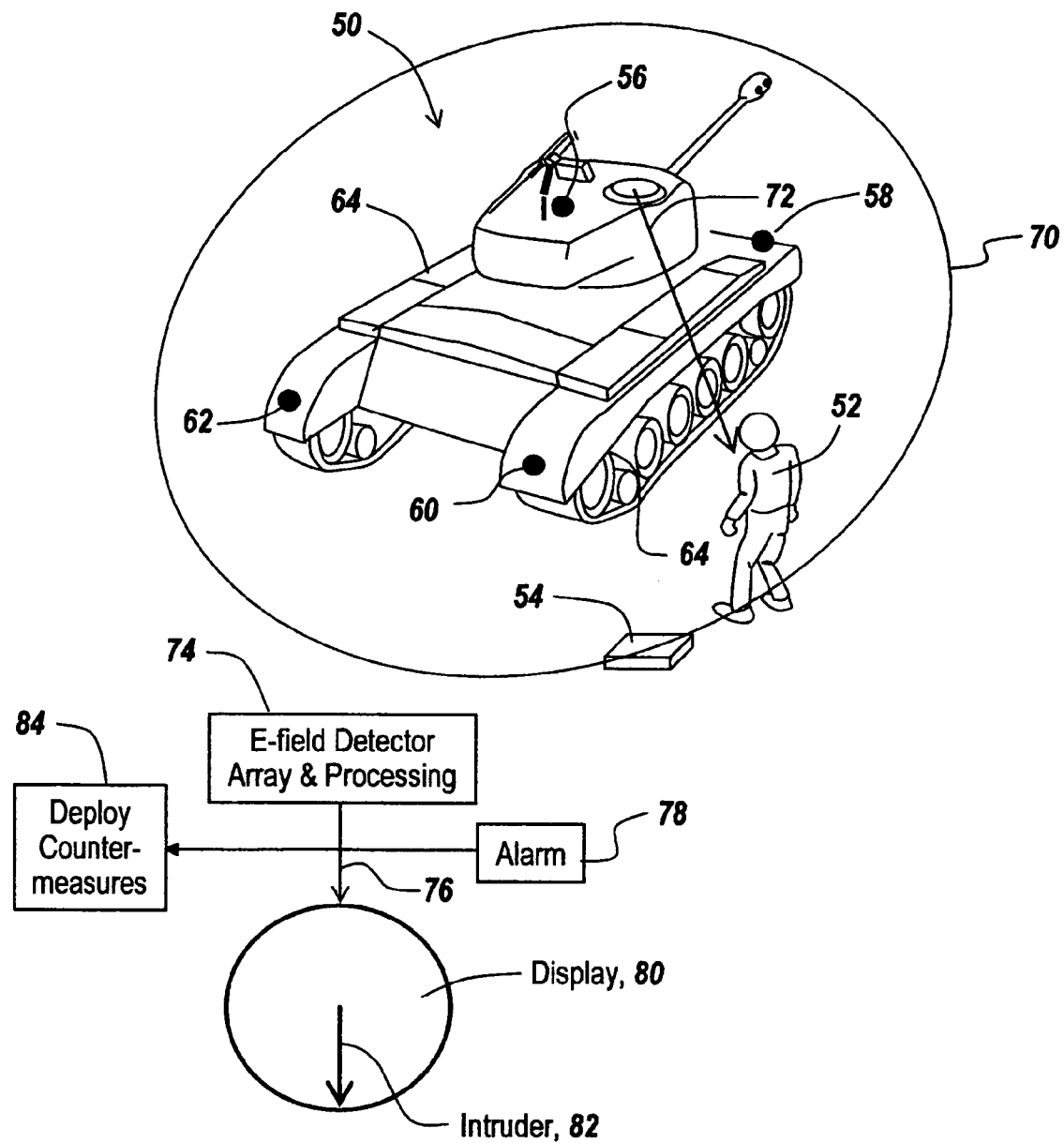
FIG. 4 is a diagrammatic illustration of the use of E-field sensors to provide a protection zone around a military vehicle to sense near-in intrusion and to be able to countermeasure the intruder once having determined his presence and direction.

Referring now to FIG. 4, in the military environment it will be appreciated that personnel confined within a tank 50 have very limited ability to ascertain near-in intruders such as, for instance, an individual 52 carrying with him a satchel charge or IED 54. By mounting E-field sensors 56, 58, 60 and 62 on the fenders 64 of tank 50, the E-field sensing system within the tank detects the presence of any individuals walking in a protected zone 70. Not only can the presence of the intruder be detected but also his direction as illustrated by arrow 72.

As can be seen, an E-field detector array and processing module 74 is deployed on the vehicle to be protected, which has an output on line 76, an indication of the presence of an intruder, which may be used to activate an alarm 78 or provides signals to a display 80, which produces an intruder indicator 82, indicating the direction from the tank that the intruder is located. As illustrated at 84, responsive to an output from module 74, countermeasures such as shaped charges away from the vehicle may be deployed in the direction of individual 52 so as to take out the individual as well as nullifying any effect of the explosive device.

It will be appreciated that by the use of the E-field sensors, since they are passive, there is no radiation to be detected by intruders or enemy combatants that would indicate which vehicle is protected.

Moreover, because the E-field sensors are in general planar and can be camouflaged on top of surfaces of the tank, the presence of an E-field system aboard a tank or other military vehicle is disguised and therefor also undetectable.

This means that the E-field sensing system is a stealth system, which provides information to occupants of the vehicle about intrusion in a protected area around the vehicle.

Figure 5:
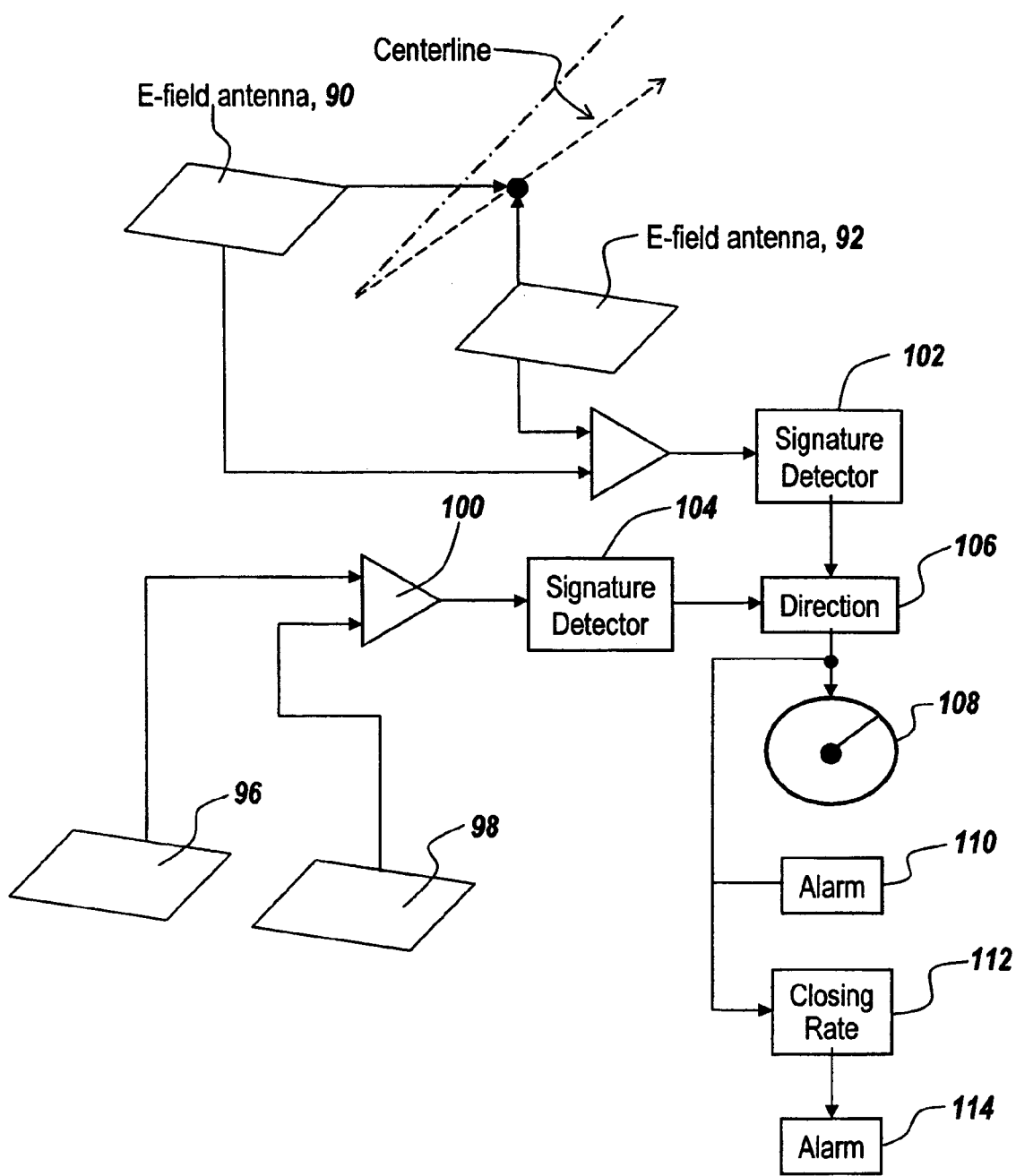
FIG. 5 is a schematic diagram of the subject E-field sensor system employing pairs of E-field sensors at the front and rear of a vehicle to provide 360° coverage, with signature detectors employed to distinguish between non-threats and threats or objects of interest versus those that are not of interest.

Referring now to FIG. 5, in one embodiment pairs of E-field antennas 90 and 92 are coupled to a differential amplifier 94, whereas E-field antennas 96 and 98 are coupled to its respective differential amplifier 100. Differential amplifiers 94 and 100 are respectively coupled to signature detection and E-field dE/dt processing as illustrated by modules 102 and 104.

Through techniques described hereinbefore, the change of the E-field is that which is detected by each of the E-field detectors' antennas, which is accomplished by virtue of being the partial derivative of the voltage on an E-field antenna.

However, in the more simplified case of FIG. 5, rather than using the voltage as an indication of E-field, in the subject case in one embodiment it is current that is detected, with the differential current specifying the direction of the intruding object.

However, if only two pairs of E-field antennas and corresponding sensors are used for 360 coverage, the use of double pairs permits both fore and aft, 180° coverage when connected as shown, or when connected with antennas 92 and 98 being considered a pair and antennas 90 and 96 being a pair, then quadrants can be ascertained in terms of coverage. Regardless, the outputs of the signature detectors are coupled to a direction determining module 106, which is coupled to a display 108 to display the direction of the object creating the E-field disturbance, with an alarm 110 being activated upon an intruder within the E-field protection zone. Moreover, one can also from the output of unit 106 determine the closing rate 112 of the object to the protected vehicle, such as would be the case when a vehicle is closing in on a vehicle in front of it.

Correspondingly, when the closing rate exceeds a certain threshold, an alarm 114 may be sounded to alert the occupant of a detected object coming in towards the protected vehicle.

Figure 6:
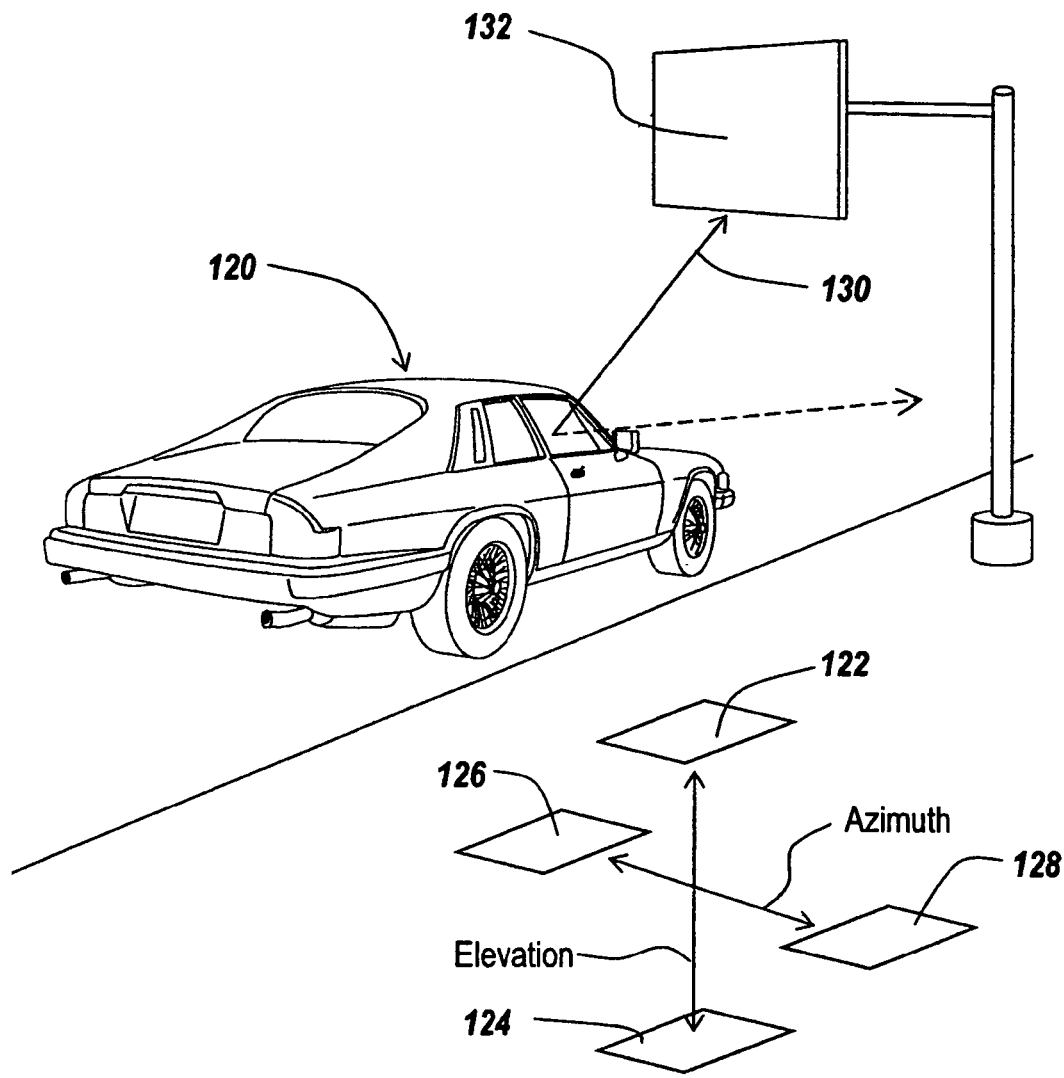
FIG. 6 is a diagrammatic illustration of the use of a vertical pair of E-field sensors aboard a vehicle to be able to ascertain elevation of an object of interest, thereby to eliminate from consideration, for instance, overhead signs, which have relative motion with respect to a vehicle passing underneath them; and, FIG. 7 is a schematic diagram of the current-sensing embodiment of the subject invention.

Referring to FIG. 6, when a vehicle 120 is provided with a pair of E-field sensors 122 and 124 that are vertically disposed, as opposed to the horizontally disposed pair of sensors 126 and 128, it is possible to detect the elevation 130, for instance, of an overhanging sign 132 so as to be able to ignore, for instance, detected E-field disturbances that occur above a roadway as opposed to being a threat within a roadway.

Moreover, such vertically oriented pair of sensors may be employed to detect the elevation of the trajectory of an incoming round or other object. Alternatively the presence of a low overpass can be detected using the vertically spaced sensors.

Figure 7:
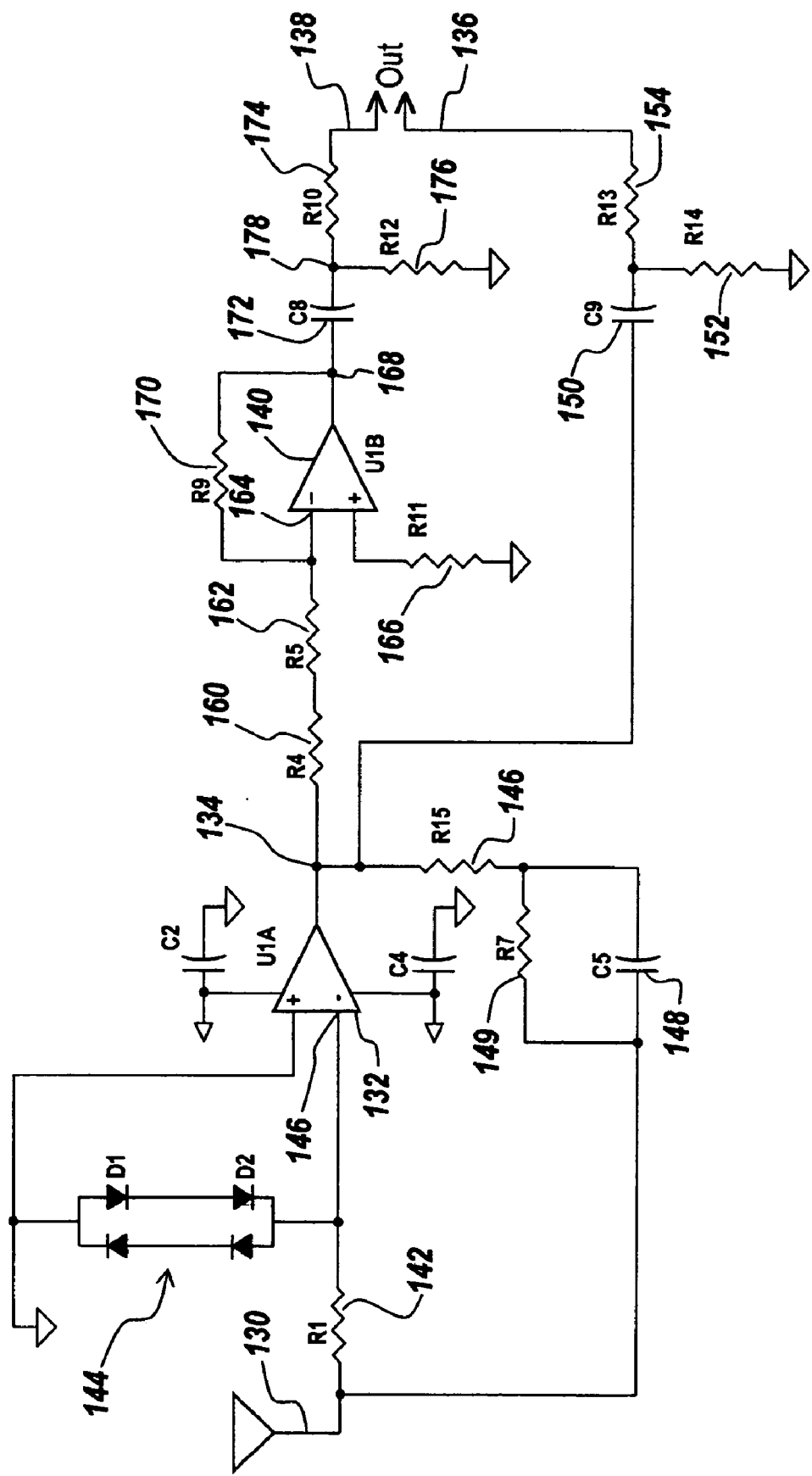

Referring now to FIG. 7, what is shown is the current-sensing embodiment of the subject invention in which an E-field sensing patch 130 is coupled to the one of the two inputs of a differential amplifier 132 having an output 134, which is a voltage corresponding to the current through the amplifier. This voltage is available at output 136 or in an inverted form at 138, with the voltage at 134 having been applied to an inverter 140.

It is noted that a resistor 142 is utilized as a protection resistor for operational amplifier 132, whereas a diode package indicated by arrow 144 is utilized as a clamp to ground so that high voltages are not applied to operational amplifier 132.

As can be seen, operational amplifier 132 has its output at 134 fed back through a resistor 146 and more importantly through an R-C circuit comprised of capacitor 148 and resistor 149 such that the voltage at the input to operational amplifier 132, namely at input 146, is forced to zero. The result is that the voltage at output 134 is proportional to the input current. This is because input 136 is at virtual ground, which forces the voltages at this input to zero.

Note that resistor determines the transfer gain of the operational amplifier 132, whereas capacitor 148 forms a low pass filter.

The E-field sensed is sensed in terms of current because the patch looks like it is working into a short circuit. In so doing operational amplifier 132 converts the current back to voltage, which is available at output 134.

The output at 134 is coupled through a circuit comprised of capacitor 150, a resistor to ground 152 and a series-connected resistor 154 to strip off any DC offset such that when one has no signal at the input, what is coupled out at output 136 is an AC signal without any DC component. The result is to remove the problem of a capacitive load on the output and to stabilize the operational amplifier itself.

Output 134 is coupled through resistors 160 and 162 to an inverter at the ungrounded output 164 of operational amplifier 140, which has its other input grounded through resistor 166. As is typical in an inverter, the output of operational amplifier 140 at 168 is fed back through a resistor 170.

The current at 168 is therefore an inverted version of the input to this traditional inverter, with output 168 coupled through capacitor 172 and resistor 174 to output 138. A resistor 176 is coupled to ground and taps the junction 178 between capacitor 172 and resistor 174. Again, the purpose of this circuit at output 168 is to remove DC bias and to protect the operational amplifier.

The differential output of this circuit is used to detect E-field changes at patch 130, with the advantage of the current-sensing embodiment to provide a low input impedance at differential amplifier 146 and to permit the usage of an E-field sensing patch that does not have to be above ground or stick out from the surface of a vehicle.

Most importantly, the current-sensing embodiment is much less sensitive to environmental concerns such as rain or moisture.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for providing a vehicle with situational awareness, including the presence and position of an object moving relative to the vehicle in a protection zone thereof, comprising the steps of:
    providing an array of E-field sensors on the vehicle; and,
    processing the outputs of the E-field sensors to detect the presence and direction of an object within the protection zone around the vehicle.

2. The method of claim 1, wherein the protection zone is established by the range of the E-field sensors.

3. The method of claim 1, wherein said array of sensors includes two spaced-apart sensors, each sensor sensing an E-field disturbance within the protection zone.

4. The method of claim 3, wherein the E-field sensors detect the E-field disturbance at the sensor in terms of voltage.

5. The method of claim 1, wherein said E-field sensors detect the E-field disturbance in terms of the current generated by the E-field at the sensor as a result of the disturbance.

6. The method of claim 1, wherein the direction of an object entering the protection zone is determined by the differential amplitude of the E-field disturbance caused by the object in the protection zone at each of a pair of the E-field sensors, the difference in amplitude at each of the E-field sensors determining the direction of the object disturbing the E-field within the protection zone.

7. The method of claim 1, wherein the presence of and direction to an object disturbing the E-field in the protection zone causes an alarm condition indication in the vehicle.

8. The method of claim 7, wherein the alarm indication includes direction to the object creating the E-field disturbance in the protection zone.

9. The method of claim 1, and further including detecting the range of the object creating an E-field disturbance in the protection zone.

10. The method of claim 9, and further including the step of providing an indication of closing rate for the object creating an E-field disturbance in the protection zone.

11. The method of claim 10, and further including the step of controlling vehicle parameters in response to a predetermined closing rate.

12. The method of claim 1, wherein said E-field sensors include an array of sensors to the rear of the vehicle, and further including the step of indicating the presence of an individual to the rear of the vehicle when the vehicle is backing.

13. The method of claim 1, wherein the range of the E-field sensors is set to limit the protection zone around the vehicle to one lane, whereby vehicles in an opposing lane that create E-field disturbances are ignored.

14. The method of claim 1, and further including the step of determining the direction to an object causing an E-field disturbance in the protection zone and ignoring all objects causing E-field disturbances that are at an angle greater than a predetermined angle from the direction of travel of said vehicle, whereby oncoming vehicles in a different lane can be discriminated against by virtue of the off-axis angle of the corresponding E-field disturbance.

15. The method of claim 1, whereby the vehicle has a blind spot, and further including the step of indicating from the outputs of the E-field sensors the direction of an object creating an E-field disturbance in the protection zone in the direction of the blind spot and causing an alarm indication responsive to an object causing an E-field disturbance in the blind spot.

16. A method for protecting an armored vehicle having limited visibility by detecting intruders close in to the vehicle, comprising the steps of:
    providing the vehicle with an array of E-field sensors;
    determining the presence of an intruder from the outputs of the E-field sensors to be within a predetermined protection zone;
    alerting personnel in the armored vehicle upon detecting the presence of an intruder within the protection zone; and,
    ascertaining the direction to a detected intruder in the protection zone and deploying countermeasures in the direction of the detected intruder.

17. The method of claim 16, wherein the intrusion detection includes the step of matching an E-field signature with an E-field signature indicating steps of an individual, thus to be able to detect human intruders within the protection zone.

18. Apparatus for providing a protection zone around a vehicle, comprising:
    an array of E-field sensors;
    a processor for processing the outputs of the E-field sensors to detect the presence and direction of an object in said protection zone; and,
    an indicator within said vehicle for indicating the presence of an object causing an E-field disturbance within said protection zone.

19. The apparatus of claim 18, wherein said processor includes an algorithm for determining the direction of an object creating an E-field disturbance within said protection zone.

20. The apparatus of claim 18, wherein said processor includes an algorithm for determining the location of said E-field disturbance-producing object.

21. The apparatus of claim 20, wherein said processor includes an algorithm for determining the closing rate of said object in said protection zone relative to said vehicle.

22. The apparatus of claim 18, wherein said array of E-field sensors includes horizontally spaced-apart sensors and vertically spaced-apart sensors, and wherein said processor includes an algorithm for determining both direction and elevation of an object in said protection zone.

23. The apparatus of claim 22, wherein said processor includes an algorithm for ignoring objects in said protection zone having an elevation above a predetermined elevation.

24. A method for providing a vehicle with situational awareness including the presence and position of an object moving relative to the vehicle, comprising the steps of:
   providing an array of E-field sensors on the vehicle;
   processing the outputs of the E-field sensors to detect the presence of an object within a protection zone around the vehicle; and,
   determining the direction to an object causing an E-field disturbance in the protection zone and ignoring all objects causing E-field disturbances that are at an angle greater than a predetermined angle from the direction of travel of said vehicle, whereby oncoming vehicles in a different lane can be discriminated against by virtue of the off-axis angle of the corresponding E-field disturbance.

25. A method for providing a vehicle with situational awareness where the vehicle has a blind spot, including providing the presence and position of an object moving relative to the vehicle, comprising the steps of:
   providing an array of E-field sensors on the vehicle;
   processing the outputs of the E-field sensors to detect the presence of an object within a protection zone around the vehicle;
   indicating from the outputs of the E-field sensors the direction of an object creating an E-field disturbance in the protection zone in the direction of the blind spot; and,
   causing an alarm indication responsive to an object causing an E-field disturbance in the blind spot.

* * * * *